United States Patent Office 2,996,549
Patented Aug. 15, 1961

2,996,549
3,6-DIMETHYLOCTANE-3,6-DIHYDROPEROXIDE
Orville L. Mageli, Kenmore, and Edward Chang, Snyder, N.Y., assignors to Wallace & Tiernan, Incorporated, Newark, N.J.
No Drawing. Filed July 5, 1957, Ser. No. 669,961
1 Claim. (Cl. 260—610)

The present invention relates to an organic hydroperoxide and to a method of preparing the same, and more particularly to 3,6-dimethyloctane-3,6-dihydroperoxide.

Dihydroperoxides have been prepared and certain of their chemical and physical characteristics reported, as for instance by Criegee and Paulig, Chemische Berichte 88, page 712 (1955), Criegee and Dietrich, Annalen der chemie, 560, 135 (1948).

These products have been of some interest as adding to the knowledge of organic hydroperoxides and products which show some versatility over the hydroperoxide reported by Milas, U.S. Patent No. 2,176,407.

Many of the organic hydroperoxides of the prior art have possessed inherent instability and certain of them have been hazardous in storage and transportation. The hazard in certain of the prior art arises from thermoinstability and from volatility.

Furthermore, certain of the prior art organic dihydroperoxides are solids at room temperature, are prepared by reaction, normally with hydrogen peroxide, upon another reactant which is solid, to produce a solid final product. In such operations, yields are often low in the product ultimately obtained and very often the desired end product does not possess that degree of purity desired in active oxygen containing materials.

It is an object of the present invention to prepare a liquid dihydroperoxide which is thermally stable and which possesses low volatility.

It is also an object of the present invention to produce a new organic dihydroperoxide which is liquid at room temperatures and which, therefore, may be handled in storage, shipment and use, as a liquid product with attendant advantages.

It is also an object of the invention to produce an organic dihydroperoxide readily and easily, and in yields in excess of those available heretofore.

It is an object of the invention to produce a new organic dihydroperoxide, 3,6 - dimethyloctane-3,6-dihydroperoxide.

In the broad aspect of the invention, the new and novel organic dihydroperoxide, 3,6-dimethyloctane-3,6-dihydroperoxide is produced by the action of hydrogen peroxide in an acidic environment upon the corresponding glycol, namely, 3,6-dimethyloctane-3,6-diol.

In order to prepare the new dihydroperoxide, 3,6-dimethyloctane-3,6-dihydroperoxide, the indicated glycol is treated wth an aqueous solution of hydrogen peroxide which will generally be of a strength greater than 3% by weight $H_2O_2$. In practical operation, however, and with commercially available aqueous hydrogen peroxides of 50% to 92%, such higher concentrations of hydrogen peroxide are recommended since the reaction time is shorter, the higher the peroxide concentration, as a general rule, as are the yields and purity of wanted end product.

The reaction of the hydrogen peroxide upon the selected glycol proceeds more rapidly in an environment containing a relatively large amount of hydrogen ion, which hydrogen ion is preferably obtained from a mineral acid, such as sulfuric acid, phosphoric acid and nitric acid, among others.

Although any peroxide, liberating hydrogen peroxide in aqueous solution, can be employed as a source of hydrogen peroxide, viz., sodium peroxide, calcium peroxide, urea peroxide, etc., from a practical operating point of view, hydrogen peroxide will, in general, be the reagent employed as the source of the peroxygen reactant to peroxidize the glycol.

The formation and production of the wanted dihydroperoxide will proceed slowly at temperatures below room temperature. It is not recommended that temperatures above about 50° C. be employed when performing the reaction between the 3,6-dimethyloctane-3,6-diol and reactant employed as the source of hydrogen peroxide, since at temperatures above about 50° C., the yield of wanted product is reduced, probably by reason of decomposition of one or more of the reactants, the presence of unwanted side reactions proceeding at a speed which is undesirable and the probable decomposition of the wanted end product which may, at such elevated temperatures, proceed at a hazardous rate.

The reaction between the specified glycol and the hydrogen peroxide may occur in aqueous solution or may be performed in the presence of solvents which may be solvents for one or more of the reactants. These solvents may be aliphatic hydrocarbon solvents, aromatic, hydrocarbon solvents, or halogenated hydrocarbon solvents. Reaction, however, proceeds smoothly with good yields and control inaqueous solution and in the absence of solvents.

The following examples are given merely as illustrative of the principles of the invention and are not deemed to be limitative thereof.

EXAMPLE 1

3,6-dimethyloctane-3,6-dihydroperoxide was prepared in a series of runs at different ratios of reactants, glycol (diol) to hydrogen peroxide being mixed with the specified amount of 50% hydrogen peroxide, an amount of 77% sulfuric acid sufficient to produce an aqueous solution containing about 35% by weight of sulfuric acid based on combined weight of the mixture. This addition of acid to the aqueous hydrogen peroxide was performed preferably at a temperature somewhat below room temperature in order to prevent decomposition of the reagent.

After the production of the acidic aqueous hydrogen peroxide environment, 3,6-dimethyloctane-3,6-diol was mixed therewith under stirring, generally by adding successive portions thereof to the acidic hydrogen peroxide.

The temperature was raised to somewhat above room temperature but below 50° C. and the glycol reactant added in increments and the mixture maintained below about 50° C. until the peroxidation was completed which required, depending upon the temperature, about 1 hour, which time will be increased where the temperature is lower.

In the experiments listed in the table below, the temperature was comparable in all experiments and was 30° C. to 35° C.; the acid concentration was also maintained constant at 35%.

In order to isolate the 3,6-dimethyloctane-3,6-dihydroperoxide, the reaction mixture was extracted with benzene, the benzene extract washed with ammonium sulfate, then with sodium acid carbonate, and finally with water, the benzene extract then being dried over anhydrous magnesium sulfate. Evaporation of the benzene yielded a crude product which could be purified by first producing the sodium or potassium salt and crystallizing the same from water.

The following table sets forth the yield of product at the specified varying diol-hydrogen peroxide ratios.

Table 1

$\frac{\text{Diol}}{\text{H}_2\text{O}_2}$ Ratio vs. Yield

| Runs | $\frac{\text{Diol}}{\text{H}_2\text{O}_2}$ mol | Diol, gm. | 50% $\text{H}_2\text{O}_2$, gm. | 77% $\text{H}_2\text{SO}_4$, gm. | Assay, Percent Act. (O) | Yield Uncorr., gm. | Yield Corr.[2] gm. | Percent Theo. |
|---|---|---|---|---|---|---|---|---|
| 1 | 1/2  | [1] 17.4 | 13.6 | 67.5  | 3.71 | 17.6 | 4.2  | 20.4 |
| 2 | 1/5  | 17.4 | 34  | 42.8  | 9.07 | 19.2 | 11.2 | 54.4 |
| 3 | 1/10 | 17.4 | 68  | 71.2  | 9.54 | 20.2 | 12.4 | 60.2 |
| 4 | 1/15 | 17.4 | 102 | 99.5  | 9.79 | 20.0 | 12.6 | 61.2 |
| 5 | 1/20 | 17.4 | 136 | 128.0 | 9.45 | 20.0 | 12.2 | 59.0 |
| 7 | 1/20 | 17.4 | 136 | 128.0 | 9.97 | 19.0 | 12.2 | 59.2 |
| 6 | 1/25 | 17.4 | 170 | 156.3 | 9.70 | 21.2 | 13.2 | 64.0 |

[1] +50 ml. $H_2O$.
[2] Corrected yield calculated from active oxygen determination:
Theoretical yield based on diol—20.6 grams.
Theoretical active oxygen content—15.54%.

After hydrolysis of the sodium or potassium salt in the presence of acid, an oily liquid is obtained. This liquid dihydroperoxide, when reduced with an iodide, as for instance aqueous potassium iodide, and the liberated iodine titrated, as for instance with thiosulfate, gave an average active oxygen content of 14.21%.

3,6-dimethyloctane-3,6-dihydroperoxide, as so prepared, possesses an index of refraction ($n_D^{30}$) of 1.4619; a density ($d_4^{30}$) of 1.0239; and a molecular refractivity ($M_R$) of 55.30. The calculated molecular refractivity is 56.06.

An important characteristic of 3,6-dimethyloctane-3,6-dihydroperoxide resides in the fact that it is a liquid at room temperature as contrasted with 2,5-dimethylhexane-2,5-dihydroperoxide which is a solid at room temperature (melting point 107° C.). The dihydroperoxide described herein is advantageously employed as a polymerization catalyst. It is thermally relatively stable and by definition is shock insensitive.

What is claimed is:

3,6-dimethyloctane-3,6-dihydroperoxide.

References Cited in the file of this patent

UNITED STATES PATENTS 2,630,456  Bell et al. _____ Mar. 3, 1953

OTHER REFERENCES

Criegee et al.: Chem. Abstracts, vol. 43 (1949), col. 6189–90 (1 page).